(12) United States Patent
Theiß

(10) Patent No.: US 11,975,941 B2
(45) Date of Patent: May 7, 2024

(54) ROTARY GUIDE FOR ONE OR MORE LINES

(71) Applicant: igus GmbH, Cologne (DE)

(72) Inventor: Georg Theiß, Cologne (DE)

(73) Assignee: igus GmbH, Cologne (DE)

( * ) Notice: Subject to any disclaimer, the term of this patent is extended or adjusted under 35 U.S.C. 154(b) by 225 days.

(21) Appl. No.: 17/761,078

(22) PCT Filed: Sep. 9, 2020

(86) PCT No.: PCT/EP2020/075192
§ 371 (c)(1),
(2) Date: Mar. 16, 2022

(87) PCT Pub. No.: WO2021/052833
PCT Pub. Date: Mar. 25, 2021

(65) Prior Publication Data
US 2022/0340394 A1 Oct. 27, 2022

(30) Foreign Application Priority Data

Sep. 16, 2019 (DE) .................... 20 2019 105 125.6

(51) Int. Cl.
*B65H 75/44* (2006.01)
*F16L 3/01* (2006.01)
*H02G 11/02* (2006.01)

(52) U.S. Cl.
CPC .......... *B65H 75/4452* (2013.01); *F16L 3/012* (2013.01); *H02G 11/02* (2013.01); *B65H 2701/33* (2013.01); *B65H 2701/34* (2013.01)

(58) Field of Classification Search
CPC ............... B65H 75/44; B65H 75/4452; B65H 2701/34; H02G 11/02
See application file for complete search history.

(56) References Cited

U.S. PATENT DOCUMENTS

| 4,744,763 A | 5/1988 | Suzuki et al. |
| 4,978,191 A | 12/1990 | Hasegawa et al. |
| (Continued) | | |

FOREIGN PATENT DOCUMENTS

| DE | 30 08 544 A1 | 9/1981 |
| DE | 32 37 581 A1 | 4/1984 |
| (Continued) | | |

OTHER PUBLICATIONS

Deutsches Patent-und Markenamt, search report in DE 20 2019 105 125.6, dated Apr. 2, 2020, pp. 1-5.
(Continued)

*Primary Examiner* — Sang K Kim
(74) *Attorney, Agent, or Firm* — CAHN & SAMUELS, LLP

(57) ABSTRACT

The invention relates to a rotary guide (1) for guiding at least one line (2) between two points (3, 4), which can be rotated relative to each other, without interruptions. Two receiving parts (12, 14) for receiving a respective sub-section of two sub-sections (29, 31), which are to be wound about the common rotational axis (X) in opposite directions, of a line section (2a), which can be received in the rotary guide (1), can be rotated relative to each other about a rotational axis (X). A deflecting unit (16) supports a deflecting region (18), in which the line section (2a) of the line (2) changes over between the opposite sub-sections (29, 31) in order to deflect the line (2) to be guided from one receiving part (12, 14) to the other receiving part (12, 14) in the event of a relative rotation. Each of the receiving parts (12, 14) has a spiral-shaped receiving groove (20, 22) with a plurality of windings (24, 26) for receiving a line section (2a), said windings running about the common rotational axis (X) from a starting radius ($r_a$) to a final radius ($r_e$), wherein the windings (24, 26) lie on a plane perpendicular to the common rota- (Continued)

tional axis (X). The deflecting unit (16) has an active surface (33) which extends or can be adjusted radially between the starting radius ($r_a$) and the final radius ($r_e$) and which interacts with the receiving grooves (20, 22) in order to transfer the line section (2a) from the receiving groove (20, 22) of the one receiving part (12, 14) to the receiving groove (20, 22) of the other receiving part (12, 14) in the event of a relative rotation.

20 Claims, 2 Drawing Sheets

(56) References Cited

U.S. PATENT DOCUMENTS

| | | | | |
|---|---|---|---|---|
| 5,707,023 | A | * | 1/1998 | Ichikawa ............ B60R 16/027 439/15 |
| 9,287,694 | B2 | | 3/2016 | Hermey et al. |
| 11,235,947 | B2 | * | 2/2022 | Theiss ................ B65H 75/4449 |

FOREIGN PATENT DOCUMENTS

| | | |
|---|---|---|
| DE | 40 04 233 A1 | 8/1990 |
| DE | 10 2006 009 167 A1 | 9/2007 |
| DE | 20 2008 001 628 U1 | 7/2009 |
| DE | 20 2011 103 263 U1 | 11/2011 |
| DE | 20 2016 105 507 U1 | 12/2017 |
| WO | 2004/093279 A1 | 10/2004 |
| WO | 2014/040903 A1 | 3/2014 |
| WO | 2014/161734 A1 | 10/2014 |
| WO | 2017/182583 A1 | 10/2017 |
| WO | 2018/065377 A1 | 4/2018 |

OTHER PUBLICATIONS

European Patent Office, International Search Report for PCT App. No. PCT/EP2020/075192, dated Nov. 24, 2020, pp. 1-4.
European Patent Office, Written Opinion for PCT App. No. PCT/EP2020/075192, dated Nov. 24, 2020, pp. 1-6.
European Patent Office, English abstract for DE323758A1, printed on Mar. 8, 2022.
European Patent Office, English abstract for DE4004233A1, printed on Mar. 8, 2022.
European Patent Office, English abstract for DE3008544A1, printed on Mar. 8, 2022.
European Patent Office, English abstract for DE102006009167A1, printed on Mar. 8, 2022.
The International Bureau of WIPO, International Preliminary Report on Patentability for PCT App. No. PCT/EP2020/075192, dated Mar. 15, 2022, pp. 1-7.

* cited by examiner

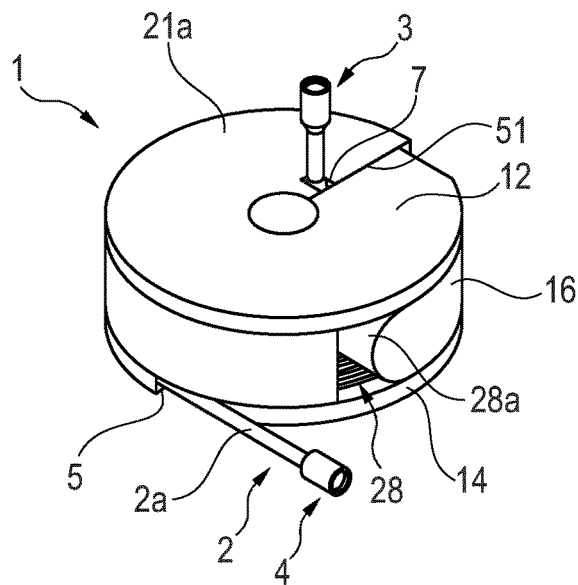
Fig. 1A
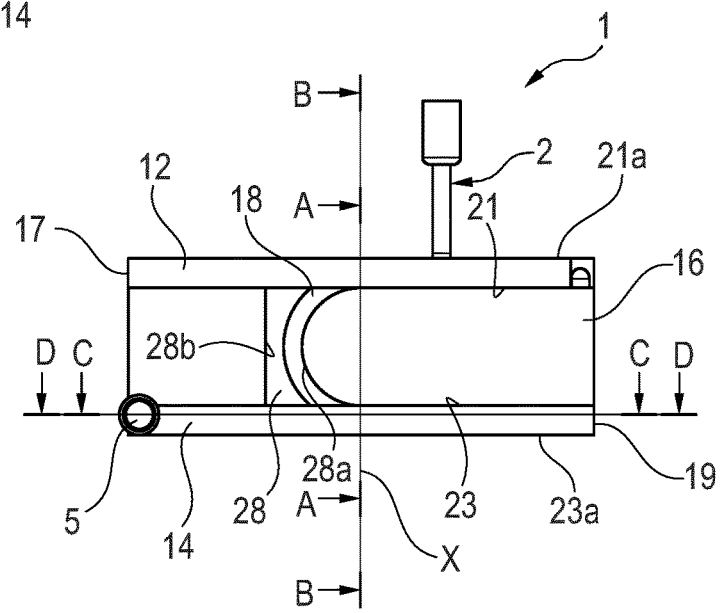
Fig. 1B
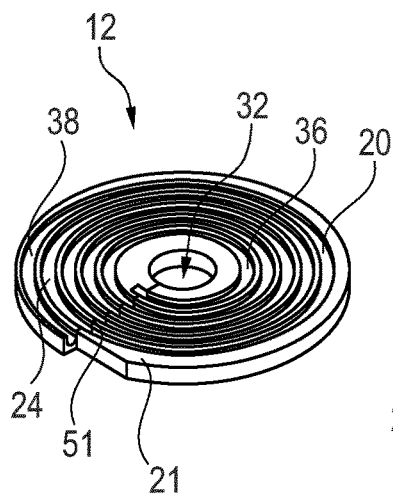 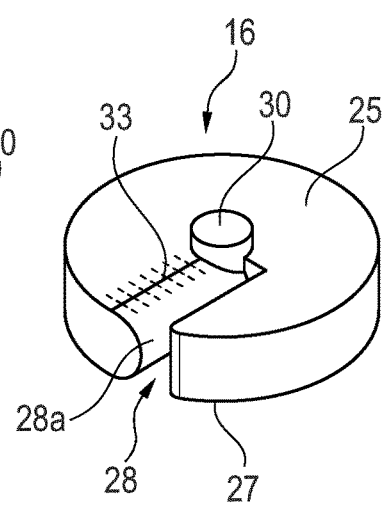 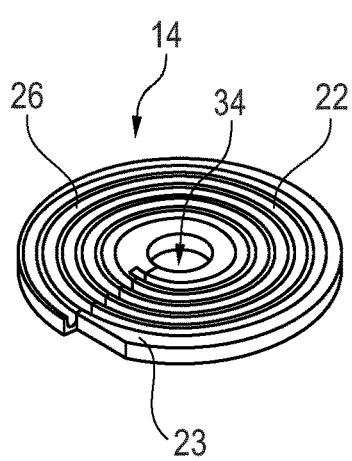
Fig. 2A　　　Fig. 2B　　　Fig. 2C

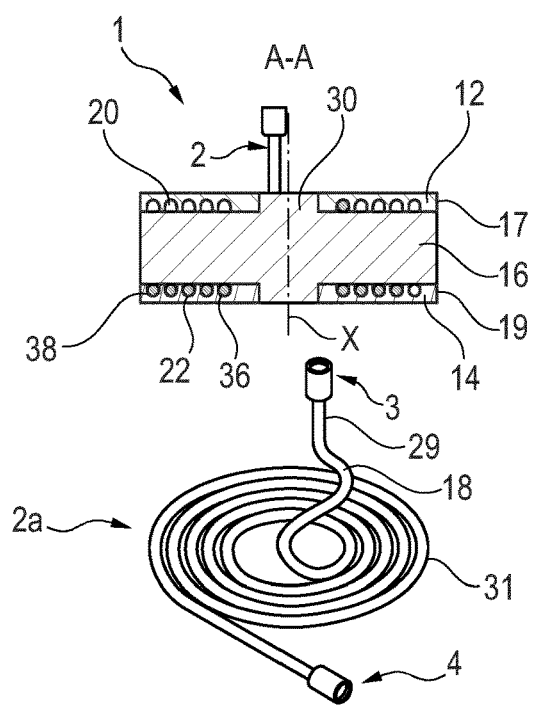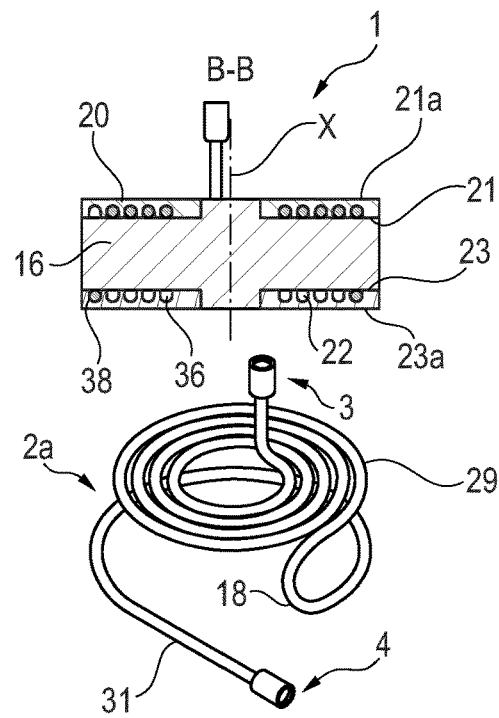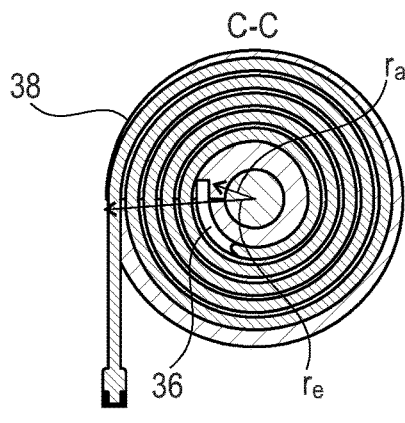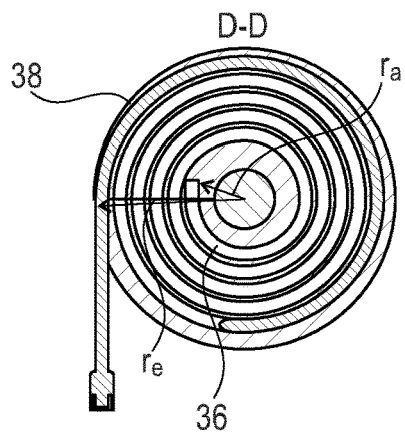
Fig. 3A          Fig. 3B
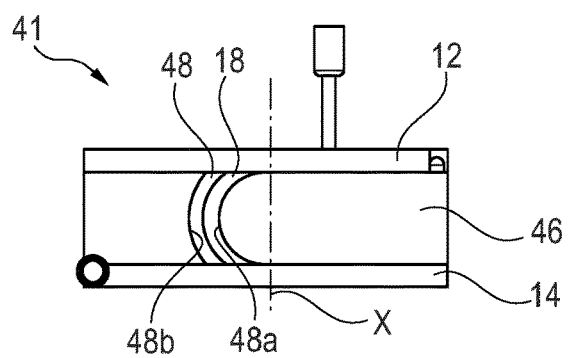
Fig. 4

ROTARY GUIDE FOR ONE OR MORE LINES

The invention relates in general to a rotary guide for at least one line or a plurality of lines which is/are intended to be guided between two points rotatable relative to one another about a predetermined or limited angle of rotation, in particular between end points of a line portion accommodated in the rotary guide.

Endlessly rotatable rotary guides are known from hydraulics and pneumatics. For electrical power or signals, for example, sliprings or sliding contacts for endless rotary transmission are well known. In both cases, it is absolutely essential to interrupt the line in order to connect the interfaces on both sides to the rotary guide or sliping.

For many applications, such as for example for lines for data transmission or indeed for lines or line guide devices or energy guide chains, which in turn guide a plurality of cables and hoses, feedthroughs with sliding contacts are unsuitable or undesirable; however, as in particular the transmission quality of a data line is impaired by interfaces such as sliprings and the like. For other applications too, for example transfer of hydraulic or pneumatic operating media via hoses, interfaces such as for example rotary couplings suffer from structural and qualitative disadvantages.

The invention therefore relates specifically to an uninterrupted rotary guide with limited angle of rotation for at least one flexible line or line guide device, i.e. a rotary guide which enables a limited angle of rotation without interruption of the line(s).

Such generic rotary guides typically comprise two receiving parts mounted rotatably about a common axis of rotation relative to one another, in particular about a predetermined or limited angle of rotation, for example housing parts for receiving respectively one of two sub-portions, to be wound up about the common axis of rotation in opposing directions, i.e. with mutually opposed directions of rotation, of a line portion receivable in the rotary guide, and a deflection unit for supporting a deflection region. Deflection region in particular denotes a variable or mobile sub-region of the line, in which, as in a reversing region, the line to be guided can be turned around between the sub-portions to be wound up in opposing directions, such that the line portion receivable in the rotary guide can be deflected on relative rotation of the receiving parts about the common axis of rotation from one receiving part to the other receiving part.

Such a generic rotary guide for flexible electrical flat cables or flat ribbon cables is known from patent specification DE 40 04 233 A1. This rotary guide of limited angle of rotation has a housing with two housing parts rotatable relative to one another about an axis of rotation. In respect to the axis of rotation, the housing defines a substantially cylindrical receiving space for an uninterrupted course of the flat cable with two cable portions wound helically, i.e. helicoidally or in the manner of a corkscrew, about the axis of rotation, with respectively multiple windings and a deflection region or U-shaped reversing region connecting these cable portions. This is curved about the axis of rotation and bent, substantially in a U-shape, about a deflection axis perpendicular thereto, such that, depending on the angular position, the one helicoidally deposited cable portion is lengthened, and the other helicoidally deposited cable portion is shortened.

A disadvantage of this rotary feedthrough is, inter alia, that a plurality of cable windings are deposited over one another, and wear or resistance therefore arises as a result of friction. In addition, sufficient axial installation space is required and the structure is comparatively complex.

A further rotary guide for uninterrupted guidance of at least one line is known from DE 20 2016 105 507 U1. This rotary guide comprises two housing parts rotatable relative to one another about an axis of rotation respectively for receiving one of two line portions curved in opposing directions about the axis of rotation. The housing parts are of substantially hollow-cylindrical or cup-like configuration, wherein the radius of the outer housing wall predetermines the curvature of the received line portion.

The rotary guide according to DE 20 2016 105 507 U1 has a simplified structure, and additionally allows the guidance of a plurality of lines for example in a corrugated hose and the like, but only over a relatively limited angle of rotation typically of 360°, and at most 540°.

A further rotary guide, which allows a greater angle of rotation, is known from WO 2017/182583 A1. Here, the line or line guide device is wound helicoidally in multiple first helical turns and multiple second helical turns, in the opposite direction to the direction of rotation of the first helical turns, about a rotational shaft. This rotary guide has a considerable axial longitudinal extent, in order to be able to receive multiple windings of the line and achieve greater angles of rotation. The windings of the line are supported against a rotationally decoupled cylindrical sleeve, which extends in the axial direction. Besides the angle of rotation, which is in principle scalable with axial structural size, the rotary guide according to WO 2017/182583 A1 has a significant advantage that in principle any desired and also multiple different lines can be passed through in uninterrupted and protected manner from one point to a point rotatable relative thereto.

In many applications, however, shallow rotary guides are desired, with small axial dimensions along the axis of rotation.

A first object of the present invention is therefore to propose a generic uninterrupted, angularly limited rotary guide, which allows angles of rotation greater than 540°, in particular greater than 1,000°, and in which the axial dimension is kept as small as possible. Friction of different line portions against one another should likewise be as little as possible.

This object is achieved by a rotary guide having the features according to Claim 1. Advantageous embodiments constitute the subject matter of the dependent claims. A further independent object consists in proposing a simplified structure which in particular allows subsequent simple insertion of different, application-dependent lines by the end user themselves.

According to the invention, it is proposed for a rotary guide according to the preamble of claim 1 that each of the two receiving parts has a spiral receiving groove with a plurality of turns extending around the common axis of rotation and from an initial radius to an end radius for at least partial reception of a line portion in the receiving groove, wherein the turns, preferably all the turns, of the receiving groove of both receiving parts respectively extend in a plane predetermined by the respective receiving part perpendicular to the common axis of rotation. The spatial shaping of the receiving grooves may respectively correspond in particular respectively to a planar spiral.

According to the invention, the deflection unit in this case has at least one active area extended radially or adjustable radially relative to the common axis of rotation between the initial radius and the end radius, which interacts with the receiving grooves of the receiving parts in order, on relative rotation of the receiving parts about the common axis, to wind the line portion of the line(s) to be guided from the receiving groove of the one receiving part into the receiving groove of the other receiving part.

One line portion, to be received in the rotary guide, of a line or line guide device to be guided may be received completely or only in part in the receiving groove in the axial direction or depth direction of the receiving groove. In the case of partial reception, a depth of the receiving groove or the dimension of the receiving groove may be smaller in the axial direction than the diameter of the line or line guide device within the line portion, such that, when viewed in a section plane parallel to the axis of rotation, the line portion in question may protrude in part from the receiving groove. Complete reception of the line(s) in the receiving grooves is preferred. The depth of the receiving groove is in any event preferably the same in all the turns.

The spiral shape of the receiving groove according to the invention is thus not helical, helicoidal or corkscrew-like. Rather, a groove is proposed which extends in a plane perpendicular to the axis of rotation of the rotary guide, in particular exclusively in the manner of a planar spiral.

The turns of the spiral-shaped receiving groove according to the invention thus extend about the axis of rotation in a plane from a smallest initial radius, the radius of the spiral at the starting point of the receiving groove, to a largest end radius, the radius of the spiral at the endpoint of the receiving groove, wherein, considered for example in polar coordinates, the radius r of the turns increases, in particular grows constantly with the angular dimension of the polar angle. This explanation should be understood in mathematical terms.

All the turns of the receiving groove preferably intersect a plane which extends perpendicular to the axis of rotation.

The active area may extend radially according to the invention relative to the axis of rotation of the rotary guide. It may for example be formed at least in part by an arcuate area on the deflection unit, the axis of curvature of which extends in the radial direction. The active area may comprise a plurality of separate portions, which do not necessarily have to form a connected surface in the geometric sense.

The active area may alternatively or additionally also be radially adjustable or displaceable. The active area may, for example, be formed by the surface of a roll, which is rotatable about a roll axis which extends radially relative to the axis of rotation of the rotary guide, wherein the roll may be mounted radially adjustably along this roll axis. In this case, the surface of the roll may also form a connected active area, for example an inner half of a toroidal surface.

One advantage of the solution according to the invention is that the rotary guide can be particularly shallow, with a particularly low axial total dimension but nevertheless a large angle of rotation.

One part or connection point of the line on a first side of the rotary guide may, in particular, be rotated by a plurality of complete revolutions relative to a further part or connection point of the line on the second side of the rotary guide, without the line in the rotary guide being interrupted or damaged and without increasing the axial dimensions.

The line portion receivable in the rotary guide of the line(s) or of the line guide device is transferred during rotation out of the receiving groove of the one receiving part into the receiving groove of the other receiving part by the deflection unit in a manner that protects the line, wherein different longitudinal regions of the line portion do not rub against one another. The receiving groove protects the received line portion from friction from the surface of a longitudinal region on the surface of another longitudinal region of the line portion.

The sub-portions to be wound up in opposing directions of a receivable line portion are respectively receivable in a receiving part, and the deflection region is supportable between the sub-portions by the deflection unit.

The active area of the deflection unit interacts with the receiving parts, in order to transfer the line portion of the line(s) or of the line guide device out of one shallow spiral-shaped receiving groove into the other shallow spiral receiving groove. The guided line may in this case be transferred from one turn of the one receiving groove into the corresponding turn of the other receiving groove, which has the same radial distance relative to the axis of rotation.

The radial distance from the deflection region to the axis of rotation may in this case vary between the initial radius and the end radius of the spiral-shaped receiving groove, in particular it may change continuously with the relative angle of rotation. Since at least one active area of the deflection unit extends radially or may be radially adjusted between the initial radius and the end radius of the spiral, the active area may interact with the receiving grooves in various radial regions or at various turns, optionally also in order to bring about the intended positioning of the line(s) or line guide device into this turn of the receiving groove. What is advantageous here is the possibility of achieving a plurality of turns and correspondingly larger angles of rotation without the line(s) getting entangled.

The rotary guide according to the invention is suitable for guiding both just one line, or also multiple lines. To guide multiple lines, a line guide device is preferably used which receives these, such as for example a flexible protective sleeve, a three-dimensionally deflectable energy guide chain or the like.

A line may in turn comprise one or more strands, for example one or more electrical cables, in one common flexible sheath or the like.

The invention is not limited to electrical supply lines, but rather also allows rotatable, uninterrupted guidance of media lines such as, for example, pneumatic or hydraulic hoses. Combinations of electrical supply cables and media hoses may also be guided. To this end, the use of a suitable line guide such as, for example, a three-dimensionally deflectable energy guide chain is particularly advantageous.

The rotary guide according to the invention may be comparatively simply fitted or equipped by a user with the line(s) or the line guide device, since the line(s) or line guide device may be simply inserted into the planar, axially accessible receiving grooves of the receiving parts and attached to or around the deflection unit.

The line portion receivable in the rotary guide is in this case preferably secured in its longitudinal line direction. The line portion may preferably be locked or secured at an endpoint in the respective receiving part in the longitudinal line direction.

The deflection unit may be arranged rotatably between the receiving parts. One of the two receiving parts may preferably be mounted in relatively rotatable manner on the other receiving part by means of the deflection unit.

A further advantage lies in the fact that the line portion received in the rotary guide is protected from tensile load, since on rotation the deflection region moved in the circumferential direction may be supported in any position by the co-rotating deflection unit.

The deflection unit may in particular also serve as an axial spacer for the receiving parts rotatable relative to one another.

The minimum axial distance of the receiving parts from one another may correspond in particular to twice the minimum radius of the deflection region or a minimum just permissible bending radius of the line or line guide device to be guided.

For rotary mounting, the deflection unit may have a rotary pin and the receiving parts respectively a matching rotary opening coaxial to the axis of rotation. Inversely configured mounting is also possible. The receiving parts and the deflection unit may also respectively have rotary openings and be rotatably mounted on a separately embodied shaft or the like.

The deflection unit may in particular support the line(s) in the deflection region on reversal between the two sub-portions to be opposingly wound, for example to prevent kinking or overbending of the line(s), such that, on bending of the guided line(s) in the deflection region, bending does not fall below the minimum just permissible bending radius or radius of curvature.

The deflection unit may in particular have a deflection guide, for guiding the line portion over the deflection region into the receiving groove of the other receiving part. The deflection guide may in this case preferably comprise or provide at least one part of the active area, which interacts, on relative rotation of the receiving parts, with the receiving grooves of the receiving parts, in order to wind the line portion from the receiving groove of the one receiving part into the receiving groove of the other receiving part.

The deflection guide may counteract undesired unwinding of the line portion out of the rotary guide, for example if the line portion is wound from a rotating receiving part into an at rest or stationary receiving part. In one preferred embodiment, to this end the deflection unit is of dished construction, with two in particular substantially flat sides, wherein each of the sides respectively faces a receiving groove of one of the receiving parts when the rotary guide is in an assembled or operationally ready state, and preferably be flush with a corresponding mating face of the receiving part, in order to cover and/or axially delimit the receiving groove. The deflection unit may thus work together with the facing face of the receiving part to counteract unintended escape of the line portion from the receiving groove. This shaping of the deflection unit is additionally particularly advantageous for predetermined forced guidance of the line portion out of the deflection region into one of the receiving grooves.

The deflection guide may preferably be formed by boundary faces of a guide slot in the deflection unit with a radial and axial extent. In particular, the guide slot may extend in the axial direction from one to the other flat side of the deflection unit. The guide slot may preferably extend from one edge of the deflection unit radially in the direction of the axis of rotation, such that the guide slot extends at least up to the point whose distance from the axis of rotation roughly corresponds to the initial radius of the innermost turn of the receiving groove of one of the receiving parts. The guide slot should preferably have a width which is at least slightly greater than the diameter of the line to be guided. Even if one or a plurality of lines is received in a line guide device or is bound in a bundle and intended to be guided with the line guide device or as a bundle in the rotary guide, the width of the guide slot should be at least slightly greater than the diameter of the line guide device or of the bundle. Width is here used to designate the minimum distance between mutually facing boundary faces of the guide slot from one another in a direction perpendicular to the axis of rotation and perpendicular to the radial direction. This has the advantage, inter alia, that introduction of the line(s) into the rotary guide is simplified for the user. Particularly, preferably, the width of the guide slot is however such that no excessive play arises, for example less than three times the diameter of the line or line guide device to be guided.

A first boundary face of the guide slot may in this case be configured as a convex surface of a half-cylinder with a cylinder axis extending perpendicular, in particular radially, relative to the axis of rotation. A second boundary face may face the first boundary face in a circumferential direction or in a direction perpendicular to the axis of rotation and perpendicular to the radial direction. The second boundary face of the guide slot may, in a section plane perpendicular to the axis of rotation, extend parallel to the first boundary face. The second boundary face may be configured as a concave surface, in particular configured to fit with the semi-cylindrical convex surface, for example as a concave surface of a half-cylinder whose cylinder axis extends parallel to the cylinder axis of the first boundary face. The guide slot may thus be substantially U-shaped when viewed in the radial direction relative to the axis of rotation, with a U bend pointing in or contrary to the direction of rotation.

In a section plane parallel to the axis of rotation, the guide slot may, in particular, take the form of a ring segment. The inner radius of the ring segment should be greater than or equal to the minimum just permissible radius of the deflection region of the line to be guided.

The outer radius of the ring segment may in particular be greater than the inner radius of the ring segment.

The minimum distance between the first and second boundary faces of the guide slot in a direction perpendicular to the axis of rotation and perpendicular to the radial direction or internal width of the guide slot is preferably greater than or equal to the diameter of the line or line guide device to be guided, particularly preferably less than three times the diameter of the line or line guide device to be guided.

The distance between the first and second boundary faces of the guide slot may remain substantially constant in the radial direction, in particular in the radial and axial directions. In this case, the distance corresponds to or is only insignificantly greater than the width of the receiving groove or the track width of the receiving groove in the radial direction.

A construction with a relatively narrow guide slot is particularly advantageous inter alia with very flexible lines, the minimum permissible bending radius of which is small compared with the line diameter in order to prevent unwinding of the line portion out of the rotary guide on winding from a rotating to a stationary receiving part.

The first boundary face of the guide slot, or a part of the first boundary face, may form a part of the active area. The flat sides of the deflection unit, or respectively one part of the flat sides, may preferably form a further part of the active area. These sub-areas may preferably merge continuously or steadily into one another.

The active area may, in particular, comprise parts of the first boundary face of the guide slot and parts of the flat sides.

In one preferred embodiment of the invention, the active area has two separate regions or is in two parts. The first region of the active area preferably comprises one part of the first boundary face of the guide slot, specifically the part which adjoins the first flat side of the deflection unit, and one part of this first flat side, which adjoins the first boundary face of the guide slot. The second region of the active area preferably comprises another part of the first boundary face of the guide slot, specifically the part which adjoins the second flat side of the deflection unit, and a part of this second flat side which adjoins the first boundary face of the guide slot.

The guide slot may preferably have rounded transitions, in order to protect the line or line guide device to be guided. In particular, if the rotary guide is used for lines received inside a line guide device, the rounded transitions may prevent components of the line guide device from snagging on the rotary guide.

The radius of curvature at the innermost end region of the turns of the receiving groove may preferably be greater than or equal to the minimum just permissible radius of the deflection region of the line to be guided, such that the line portion received in the rotary guide does not become overbent and damaged.

The axial extent of the deflection unit may, in particular, be greater than or equal to twice the minimum just permissible radius of the deflection region of the line to be guided.

In a further embodiment, provision is alternatively or additionally made for the receiving parts in particular to have a smaller axial extent than the deflection unit. A rotary guide according to this embodiment is particularly shallow. The smallest possible height of the rotary guide or the smallest possible dimension of the rotary guide in the axial direction may in this case correspond to roughly equal the sum of twice the diameter of the line portion, twice the minimum just permissible radius of the deflection region of the line to be guided, and the material thicknesses of the receiving parts in the region of the bottom of the receiving grooves.

Each of the receiving parts is preferably of dished construction, with two extensive major sides, which respectively extend along a main plane of the receiving part which runs perpendicular to the axis of rotation. Narrow sides of the receiving parts may extend transversely of the major side respectively between two major sides in the axial direction. The receiving groove may be open towards one of the major sides. This major side preferably is flat in the axial direction. This shaping is particularly advantageous if the major side of the receiving part is intended to terminate flush as a mating face with a flat side of a dished deflection unit, such that the receiving groove may be covered by the flat side of the deflection unit.

The axial play between the receiving parts and the deflection unit is preferably adjustable, particularly preferably continuously adjustable, for example by a nut and bolt pairing. Axial play may preferably be adapted to the diameter of the line or line guide device to be guided. In this way, the same rotary guide may be used for lines of different diameters from a range of diameters.

In a further embodiment, the depth, preferably the depth and width, of the receiving groove, i.e. the track depth and track width of the receiving groove, may be adapted to the diameter of the line to be guided. The receiving part may bear readable data about the permissible range of line diameters for which it is suitable on its outer face, for example also in the form of a code, for example a QR code. Information relating to assembly may also be provided readably for the user on the constituent parts, for example component IDs for the two receiving parts. The same also applies to the deflection unit.

A deflection unit may optionally also be combined with different receiving parts which differ from other receiving parts for example in the geometry of the receiving groove or in other parameters. The two receiving parts used simultaneously in a rotary guide preferably, however, have the same geometry of receiving groove, in particular the same depth and width of receiving groove and the same radial distance between the turns.

The turns of each receiving groove may here run in a planar spiral, in particular an Archimedean spiral. This variant is particularly compact and allows a larger number of turns per area of a receiving part.

At least one receiving part may have a feedthrough opening to the innermost turn. One receiving part may have a feedthrough opening to the outermost turn, or one to the innermost and one to the outermost turn. Both receiving parts may also each be of structurally identical design with two feedthrough openings to allow arbitrarily selectable connection.

The feedthrough openings allow access for the lines(s) to be guided to the receiving grooves of the rotary guide and also exit of the line(s) out of the rotary guide. The rotary guide may also have a positional securing means, such as for example a locking device, retaining ring or the like on at least one of the feedthrough openings for the line to be guided, in order to fix this line to at least one receiving part in the longitudinal line direction. In a particularly simple solution, the feedthrough opening may take the form of a radial slot from one edge of a narrow side of the receiving part to the innermost turn. This feedthrough opening may allow access for the line(s) to be guided both to the innermost and to the outermost turn and is particularly advantageous for rapid lateral introduction of the line portion to be accommodated, since the line(s) do not need to be fed in, that is threaded in.

In one preferred embodiment, the receiving parts may also be standard parts. This variant simplifies inventory management and is advantageous in terms of manufacture, particularly for injection molding processes, since only one type of injection mold is necessary for the two receiving parts.

In the simplest embodiment, the rotary guide may consist of just the two receiving parts and the deflection unit as essential moldings, i.e. the rotary guide may have a three-part structure where conventional accessories, such as, for example, end fastenings, strain relief means etc. are not included.

The receiving parts and the deflection unit may preferably be made of plastics, in particular an electrically non-conductive or insulating plastics material, in particular by injection molding.

The at least one or plurality of lines may be received in a three-dimensionally deflectable line guide device or energy guide chain and/or in a flexible envelope, or indeed be connected as a strand without envelope.

A flexible envelope, in particular a hose, such as for example a corrugated hose, may bring together a plurality of electrical and/or optical cables or hydraulic and/or pneumatic hoses.

Three-dimensionally deflectable line guide devices are known for example from WO 2004/093279 A1 or WO 2014/161734 A1. Such line guide devices may be guided similarly to a line in the rotary guide between two points rotatable relative to one another and in turn guide the desired lines in protected and uninterrupted manner. However, in principle any type of three-dimensionally deflectable line guide device or energy guide is feasible, for example with ball joint connections or cardanically, multiaxially bendable joint connections between the links of the guide. Simpler, flexible guide hoses or hose packages or the like may be straightforwardly received in a rotary guide according to the invention. This is advantageous, for example, for applications in relation to industrial robots.

Further details, features and advantages of the invention are revealed, without limiting the general nature of the above teaching, by the following, detailed description of preferred exemplary embodiments on the basis of the appended figures. Identical or identically acting elements are provided with the same reference numerals and described only once. In the figures:

FIGS. 1A-1B: show a first exemplary embodiment of the rotary guide in perspective view (FIG. 1A) and in front view (FIG. 1B);

FIGS. 2A-2C: are perspective views of receiving parts of the rotary guide according to FIG. 1 (FIGS. 2A, 2C) and of a deflection unit of the rotary guide according to FIG. 1 (FIG. 2B);

FIGS. 3A-3B: show schematic representations of the mode of operation of the rotary guide according to FIG. 1 with two illustrated operational positions; and FIG. 4: shows a further exemplary embodiment of the rotary guide in front view.

FIGS. 1A-1B show an exemplary embodiment of the rotary guide 1 in an operational or assembled state. The illustrated line 2 here has two connection points 3 and 4 rotatable relative to one another about the axis of rotation X of the rotary guide 1, respectively close to ends of a line portion 2a received in the rotary guide 1, these connections being highlighted only for the purposes of illustration, however, and not being absolutely essential.

The rotary guide 1 may be used internally as a fitted part, wherein with regard to the longitudinal direction of a line 2 the latter extends continuously and uninterruptedly, for example from one device or one part of a device to another device or another part of the device. Any desired line portion 2a may here be accommodated in the rotary guide 1. The line portion 2a may be introduced into the rotary guide 1 or guided out of the rotary guide 1 through the feedthrough openings 5, 7 or through the radial slot 51, which forms or connects these feedthrough openings.

The rotary guide 1 comprises, for example, two identically constructed receiving parts 12, 14, and a deflection unit 16. These three components of the rotary guide 1 may, for example, respectively be disc-shaped and of substantially round configuration. The rotary guide 1 is assembled in a manner similar to a sandwich structure, with the deflection unit 16 lying axially between the two receiving parts 12, 14. The receiving parts 12, 14 respectively receive one of the subportions 29, 31, wound in the opposite direction from one another, of the line portion 2a, wherein the line portion 2a between the subportions 29, 31 has a deflection region 18 in which it is deflected or reversed. The deflection region 18 is bent in a U shape, specifically about a deflection axis extending perpendicular to the axis of rotation X. The deflection region 18 is supported by the deflection unit 16, which inter alia prevents the radius of curvature of the deflection region 18 from falling below the minimum just permissible value. For this purpose, the deflection unit 16 has a deflection guide 28a.

The receiving parts 12, 14 are standard parts and arranged facing one another and inverted relative to a plane perpendicular to the axis of rotation.

The receiving parts 12, 14 are of comparatively shallow construction and respectively have a first major side 21, 23, a second major side 21a, 23a and a narrow side 17, 19, wherein the narrow sides 17 and 19, respectively, connect the major sides 21 and 21a and 23 and 23a, respectively. The height or axial dimension of the narrow side 17, 19 is many times less than the diameter of the major side 21, 21a, 23, 23a. The deflection unit 16 is likewise shallow and has two flat sides 25, 27 remote from one another. When the rotary guide 1 is in the assembled state, the first side 25 of the deflection unit 16 faces the first major side 21 of the first receiving part 12 and the second side 27 of the deflection unit 16 faces the first major side 23 of the second receiving part 14.

The receiving parts 12, 14 and the deflection unit 16 are mounted to be relatively rotatable about the axis of rotation X. To this end, the deflection unit 16 has a rotary pin 30 in the center, which is of circular cylindrical configuration and coaxial with the axis of rotation X. The receiving parts 12, 14 respectively comprise a round bearing receptacle in the form of a rotary opening 32, 34 located centrally and coaxially with the axis of rotation X and matching the rotary pin of the deflection unit 16, and using which the receiving parts 12, 14 are mounted rotatably on the deflection unit 16. The axial play between the three components 12, 14, 16 may be continuously adjusted, for example by a nut and bolt pairing. To this end, the rotary pin 30 may comprise an axial through-hole for this bolted fastening, which at the same time holds the receiving parts 12, 14 axially firm against the deflection unit 16 and vice versa.

FIGS. 2A-2C show the individual essential components of the rotary guide 1 in detail. One receiving part 12, 14 has on its first major side 21, 23 a receiving groove 20, 22 configured as a recess on the first major side of the receiving part 12, 14, for receiving the line portion 2a. In the main plane of the receiving part 12, 14 perpendicular to the axis of rotation X, the receiving groove 20, 22 has the shape of an Archimedean spiral with a plurality of turns 24, 26 extending about the common axis, which corresponds to the axis of rotation X. The spiral starts at the beginning of the innermost turn 36 from an initial radius $r_a$ and extends over multiple turns 24 to an end radius $r_e$ at the end of the outermost turn 38. The distance from one turn 24 to the next turn 24 is always the same. All the turns 24 of the receiving groove 20 lie in the same plane, the main plane of the receiving part 12, 14, which extends perpendicular to the axis of rotation X. The receiving groove 20 has a constant depth or track depth over its entire course in the axial direction and a constant track width in the radial direction. The track depth and track width are selected to match the cross-section of the line 2 or of the line portion 2a to be accommodated. The line portion may then be fully accommodated in the receiving groove 20, 22 with regard to the axial direction. The receiving groove 20, 22 is open towards the major side 21, 23, which in the assembled state of the rotary guide 1, as in FIGS. 1A, 1B, faces the deflection unit 16. This major side 21, 23 is flat on the outside.

The deflection unit 16 has a guide slot 28, whose boundary faces 28a, 28b, which delimit the guide slot 28 in the circumferential direction, serve as a deflection guide for the deflection region 18 of the line portion 2a accommodated in the rotary guide 1. The guide slot 28 extends in the axial direction from one side 25 to the other side 27 of the deflection unit 16. In a plane perpendicular to the axis of rotation X, the guide slot 28 extends from one edge of the deflection unit 16, i.e. from the point whose distance from the axis of rotation X corresponds to the end radius $r_e$ of the outer turn 38 of the receiving groove 20, to the point whose distance from the axis of rotation X corresponds to the initial radius $r_a$ of the innermost turn 36 of the receiving groove 20. For instance, the deflection region 18 can be guided at the boundary faces 28a, 28b of the guide slot 28 over the entire radial extent of the receiving groove 20. In the example shown, the width of the guide slot 28 is around twice as large as the diameter of the line portion 2a, such that the deflection region 18 of the line portion 2a is guided close to the two boundary faces 28a, 28b.

The first boundary face 28a is configured as a convex surface of a half-cylinder with a cylinder axis extending radially relative to the axis of rotation X. In the exemplary embodiment in FIGS. 1A, 1B and 2B, the second boundary face 28b extends straight and in a plane parallel to the axis of rotation and perpendicular to the flat sides 25, 27 of the deflection unit 16. This is the simplest embodiment. In contrast, the rotary guide 41 according to the exemplary embodiment of FIG. 4 has a concave cylindrical second boundary face 48b of the guide slot 48. The distance between the first boundary face 48a and the second boundary face 48b in FIG. 4 is always constant along the guide slot, such that the deflection region 18 of the line portion 2a can be guided in relatively play-free manner; with regard to the remaining features, the rotary guide 41 according to the exemplary embodiment of FIG. 4 is preferably configured identically in principle to the rotary guide 1 according to the first exemplary embodiment of FIGS. 1-2.

FIG. 2B shows the active area 33 of the deflection unit 16 with hatching. The active area 33 should not be understood as a precisely delimited area. It extends radially between the outermost turn 38 of the receiving groove 20, i.e. in the present exemplary embodiment from the edge of the deflection unit 16, and the innermost turn 36 of the receiving groove 20. The precise extent of the active area in the circumferential direction depends, inter alia, on the diameter of the line portion 2a to be guided. The active area 33 is understood to be a part of the surface of the deflection unit 16 which interacts with the receiving groove 20, 22 of the receiving part 12, 14, in order to lay the line portion 2a into the receiving groove 20, 22 from the deflection region 18. The active area 33 has two regions, each of which is visible from one of sides 25, 27, for which reason just one region of the active area 33 is visible in FIG. 2A. The region of the active area 33 visible in FIG. 2B comprises one part of the surface of side 25 along the first boundary face 28a of the guide slot 28 and one part, at the top in FIG. 2B, of this same first boundary face 28a which adjoins the surface of side 25. The second region of the active area 33 is remote from the first region and configured in like manner. One region of the active area 33 acts on rotation of the rotary guide 1 and winding of the line portion 2a in one direction and the other region accordingly on rotation of the rotary guide 1 in the opposite direction.

The mode of operation of the rotary guide 1 will now be described on the basis of FIGS. 3A and 3B. FIGS. 3A and 3B are each views, at the top (in front view) and bottom (in plan view), in the drawing plane respectively of two different operating positions of the rotary guide 1 with a line portion 2a received therein. In the center of the drawing plane in FIGS. 3A and 3B, the line portion 2a is shown (in perspective view) as it extends in the rotary guide 1 between points 3 and 4 (but for greater clarity without the rotary guide 1). The bottom point 4 of the line 2 is at rest or stationary, while the top point 3 of the line 2 is rotated relative to the bottom point 4 about the axis of rotation X. The upper receiving part 12 of the rotary guide 1 rotates about the axis of rotation X together with the point 4 relative to the lower receiving part 14, which in the example shown is at rest or stationary or is secured to an immobile area which is not shown. The line portion 2a may be secured close to point 3 on the receiving part 12 or close to the innermost turn 36 in the longitudinal direction of the line 2. The other sub-portion may accordingly also be secured close to point 4.

FIG. 3A shows an exemplary operational position of the rotary guide 1, in which the receiving line portion 2a is largely located in the receiving part 14, in FIGS. 3A and 3B the lower receiving part which is at rest, and fills virtually all the turns from the outermost turn 38 to the innermost turn 36 of the lower receiving groove 22, i.e. from the end radius $r_e$ almost to the initial radius $r_a$ of the lower receiving groove 22. In this operational position, the sub-portion 31 of the line portion 2a accommodated in the lower receiving part 14 is much larger or longer than the sub-portion 29 accommodated in the upper receiving part 12. The two sub-portions 29, 31 in opposing directions are connected by the deflection region 18, in which the line 2 is reversed or deflected. On rotation of the upper receiving part 12, these portions (sub-portions 29, 31 and deflection region 18) migrate in the longitudinal direction of the line 2 and merge together. The deflection region in this case rotates in the circumferential direction and is displaced radially.

On rotation of the receiving part 12 in one direction, counterclockwise in FIG. 3A, a longitudinal region of the sub-portion 31 is transferred from the innermost turn 36 of the filled receiving groove 22 via the deflection region 18 into the innermost turn 36 of the empty receiving groove 20, or the receiving groove of the upper receiving part 12, i.e. the upper sub-portion 29 thereby becomes increasingly larger. If rotation is continued in this direction, the line portion 2a received in the rotary guide 1 may fill the turns of the upper receiving groove 12 up to and including the outermost turn 38, i.e. be wound into the upper receiving part 12. The deflection region 18 also rotates counterclockwise and, in so doing, migrates radially away from the axis of rotation X, i.e. its radial distance from the axis of rotation X grows, specifically from the initial radius $r_a$ to the end radius $r_e$ of the receiving grooves 20, 22, as can be seen by comparing FIGS. 3A and 3B. The deflection region 18 in this case lies with its inner face, relative to its axis of deflection, against the first boundary face 28a of the guide slot 28, as shown in FIG. 1B or FIG. 4. The deflection region 18 is in this case supported by the deflection guide of the deflection unit 16, namely the first boundary face 28a, which is semi-cylindrical and convex. The deflection unit 16 is co-rotated in the same direction. Since the first boundary face 28a of the deflection unit 16 extends radially from the initial radius $r_a$ to the end radius $r_e$, the deflection region 18 is continuously supported by the first boundary face 28a during winding into the upper receiving groove 20.

In addition to supporting the deflection region, the first boundary face 28a of the guide slot 28 has a second function, namely as part of the active area 33, which interacts with the receiving groove 20 on winding of the line portion 2a into the upper receiving groove 20.

The active area 33 comprises the part of the first boundary face 28a which adjoins the flat side 25 and likewise extends radially from the initial radius $r_a$ to the end radius $r_e$. Therefore, while being transferred into the turns of the upper receiving groove 20 by the active area 33, the line portion 2a is continuously supported over the radial extent of the receiving groove 20. The deflection region 18 is displaced radially during rotation along the co-rotating active area 33 and, in the process, is correctly positioned with each rotation for the next turn of the receiving groove 12 to be filled.

A further part of the active area 33, which faces the upper receiving groove 20 and, being part of the flat side 25 of the deflection unit 16, is flat, terminates flush with the flat main side 21 of the upper receiving part 12 and covers the receiving groove 20 from below, such that the longitudinal portion of the line portion 2a which is introduced into the receiving groove 20 precisely on rotation is enclosed or secured axially in the receiving groove 20 or is limited with regard to freedom of movement thereof in the axial direction and cannot fall out.

If the upper receiving part 12 of the rotary guide 1 is then rotated in the opposite direction, clockwise in FIG. 3B, a longitudinal region of the line portion 2a is transferred from the outermost turn 38 of the upper filled receiving groove 20 via the deflection region 18 into the outermost turn 38 of the lower receiving groove 22 (this operational position is illustrated in FIG. 3B). If rotation in this direction is continued, the line portion 2a received in the rotary guide 1 will once again fill all the turns of the lower receiving groove 22 over the spiral as far as the outermost turn 38 (as illustrated in the operational position in FIG. 3A). The deflection unit 16 is co-rotated in the same direction by the line portion 2a. The deflection region 18 then lies with its outer face, relative to its deflection axis, against the second boundary face 28b of the guide slot 28. The second, lower region of the co-rotating active area 33, which is not visible in FIG. 2B, interacts in the process with the lower receiving groove 22, to support winding of the line portion 2a into the receiving part 14.

LIST OF REFERENCE SIGNS

FIGS. 1A & B
1 Rotary guide
2 Line
2a Line portion
3 First point
4 Second point
5 Feedthrough opening
7 Feedthrough opening
12 Receiving part
14 Receiving part
16 Deflection unit
17 Narrow side of a receiving part
18 Deflection region
19 Narrow side of a receiving part
21a Second major side of the one receiving part
28 Guide slot
28a First boundary face of the guide slot
28b Second boundary face of the guide slot
51 Radial slot
X Axis of rotation
FIGS. 2A, 2B & 2C
12 Receiving part
14 Receiving part
16 Deflection unit
20 Receiving groove
21 First major side of the one receiving part
21a Second major side of the one receiving part
22 Receiving groove
23 First major side of the other receiving part
23a Second major side of the other receiving part
24 Turn
25 Side of the deflection unit
26 Turn
27 Side of the deflection unit
28 Guide slot
28a First boundary face of the guide slot
30 Rotary pin
32 Rotary opening
33 Active area
34 Rotary opening
36 Innermost turn of the receiving groove
38 Outermost turn of the receiving groove
51 Radial slot
FIGS. 3A & 3B
1 Rotary guide
2 Line
2a Line portion
3 First point
4 Second point
12 Receiving part
14 Receiving part
16 Deflection unit
17 Narrow side of a receiving part
18 Deflection region
19 Narrow side of a receiving part
20 Receiving groove
21 First major side of the one receiving part
21a Second major side of the one receiving part
22 Receiving groove
23 First major side of the other receiving part
23a Second major side of the second receiving part
29 Sub-portion of the line portion
30 Rotary pin
31 Sub-portion of the line portion
36 Innermost turn of the receiving groove
38 Outermost turn of the receiving groove
X Axis of rotation
FIG. 4
41 Rotary guide
12 Receiving part
14 Receiving part
46 Deflection unit
48 Guide slot
48a First boundary face of the guide slot
48b Second boundary face of the guide slot
X Axis of rotation

The invention claimed is:

1. A rotary guide (1) for uninterrupted guidance of at least one line (2) between two points (3, 4) rotatable relative to one another, the rotary guide (1) comprising:
two receiving parts (12, 14) mounted rotatably about a common axis of rotation (X) relative to one another, for receiving respectively one of two sub-portions (29, 31), to be wound up about the common axis of rotation (X) in opposing directions, of a line portion (2a) receivable in the rotary guide (1),
a deflection unit (16) for supporting a deflection region (18), in which the line portion (2a) of the line (2) to be guided can be turned around between the sub-portions (29, 31) to be wound up in opposing directions, such that the at least one line (2) to be guided is deflected on relative rotation of the receiving parts (12, 14) about the common axis of rotation (X) from one receiving part (12, 14) into the other receiving part (12, 14),
each of the receiving parts (12, 14) has a spiral receiving groove (20, 22) with a plurality of turns (24, 26) extending around the common axis of rotation (X) and from an initial radius ($r_a$) to an end radius ($r_e$) for at least partial reception of a line portion (2a) in the receiving groove (20, 22), wherein the turns (24, 26) of the receiving groove (20, 22) of each receiving part (12, 14), respectively, extend in a plane predetermined by the receiving part (12, 14) perpendicular to the common axis of rotation, and the deflection unit (16) has at least one active area (33) extended radially or adjustable radially between the initial radius ($r_a$) and the end radius ($r_e$), which interacts with the receiving grooves (20, 22) of the receiving parts (12, 14) in order, on relative rotation of the receiving parts (12 14) about the common axis of rotation (X), to wind the line portion (2a) of the at least one line (2) to be guided from the receiving groove (20, 22) of the one receiving part (12, 14) into the receiving groove (20, 22) of the other receiving part (12, 14).

2. The rotary guide (1) according to claim 1,
wherein the deflection unit (16) is arranged rotatably between the receiving parts (12, 14), and
wherein one of the two receiving parts (12, 14) is mounted rotatably on the other receiving part (12, 14) through the deflection unit (16).

3. The rotary guide (1) according to claim 1, wherein the deflection unit (16) has a deflection guide (28a, 28b) which includes at least one part of the active area (33).

4. The rotary guide (1) according to claim 3, wherein the deflection guide is formed by first and second boundary faces (28a, 28b; 48a, 48b) of a guide slot (28, 48) in the deflection unit (16) with a radial and axial extent.

5. The rotary guide (1) according to claim 4, wherein the first boundary face (28a; 48a) of the guide slot (28; 48) is configured as a convex surface of a half-cylinder with a cylinder axis extending perpendicular, radially, relative to the axis of rotation (X), wherein the second boundary face (28b; 48b) of the guide slot (28; 48) facing the first boundary face (28a; 48a) in a circumferential direction extends, in a section plane perpendicular to the axis of rotation (X), parallel to the first boundary face (28a; 48a), and is configured as a concave surface.

6. The rotary guide (1) according to claim 5, wherein the first boundary face (28a; 48a) forms a part of the active area (33).

7. The rotary guide (1) according to claim 1, wherein the deflection unit (16) is of dished construction, with two substantially flat sides (25, 27), wherein each of the sides (25, 27), respectively, faces a receiving groove (20, 22) of one of the receiving parts (12, 14), and terminates flush with a corresponding mating face of the receiving part (12, 14), in order to cover and/or axially delimit the receiving groove (20, 22).

8. The rotary guide (1) according to claim 7, wherein the flat sides (25, 27) of the deflection unit (16) form a further part of the active area (33).

9. The rotary guide (1) according to claim 1, wherein the radius of curvature at the innermost end region of the turns (24, 26) of the receiving groove (20, 22) is greater than or equal to the minimum just permissible radius of the deflection region (18) of the line (2) to be guided.

10. The rotary guide (1) according to claim 1, wherein the axial extent of the deflection unit (16) is greater than or equal to twice the minimum just permissible radius of the deflection region (18) of the line (2) to be guided and the receiving parts (12, 14) have a smaller axial extent than the deflection unit (16).

11. The rotary guide (1) according to claim 1, wherein each of the receiving parts (12, 14) is of dished construction, with two major sides (21, 21a, 23, 23a), wherein the receiving groove (20, 22) is open to one of the major sides (21, 23), and this major side (21, 23) is flat.

12. The rotary guide (1) according to claim 1, wherein an axial play between the receiving parts (12, 14) and the deflection unit (16) is adjustable.

13. The rotary guide (1) according to claim 1, wherein the depth of the receiving groove (20, 22) is adapted to the diameter of the line (2) to be guided.

14. The rotary guide (1) according to claim 1, wherein turns (24, 26) of the two receiving grooves (20, 22) run in a planar spiral.

15. The rotary guide (1) according to claim 1, wherein at least one receiving part (12, 14) has a feedthrough opening (7) to the innermost turn.

16. The rotary guide (1) according to claim 15, wherein the feedthrough opening takes the form of a radial slot (51) from one edge of a narrow side (17, 19) of the receiving part (12, 14) to the innermost turn.

17. The rotary guide (1) according to claim 1, wherein the receiving parts (12, 14) are standard parts.

18. The rotary guide (1) according to claim 1, wherein the rotary guide (1) consists of the receiving parts (12, 14) and the deflection unit (16).

19. The rotary guide (1) according to claim 1, wherein the receiving parts (12, 14) and the deflection unit (16) are made from injected molded plastics material.

20. The rotary guide (1) according to claim 1, wherein a plurality of lines is received in a three-dimensionally deflectable line guide device and/or in a flexible envelope, which is in turn arranged in the rotary guide.

* * * * *